United States Patent Office 3,484,216
Patented Dec. 16, 1969

3,484,216
SEPARATION OF FISSION PRODUCTS, PRIMARILY CESIUM, FROM URANYL SALT SOLUTIONS BY MEANS OF AN INORGANIC ION EXCHANGER, ZIRCONIUM PHOSPHATE
Sten Harald Ahrland, Lund, Sweden, assignor to Aktiebolaget Atomenergi, Stockholm, Sweden, a company of Sweden
No Drawing. Filed Feb. 14, 1966, Ser. No. 527,092
Claims priority, application Sweden, Feb. 23, 1965, 2,340/65
Int. Cl. C22b 61/04
U.S. Cl. 23—337          7 Claims

ABSTRACT OF THE DISCLOSURE

Selective separation of ions of alkali (and alkaline earth) metals, such for example as $Cs^2$ and $Sr^{2+}$, from acidic aqueous solutions containing such ions in association with uranyl ions is effected by a sorption procedure in which such solution is contacted with a sorbent consisting of a particulate zirconium phosphate having a controlled mole ratio P:Zr and a controlled content of water of crystallization.

---

Generally the invention relates to a method of selectively separating mono-atomic alkali metal and alkaline earth metal ions from the multi-atomic uranyl ion by sorption from a water solution of different metal salts, and particularly to a method of separating fission products from uranium in uranyl salt solutions. The separation of cesium and strontium, having very long-lived radioactive isotopes, is of particular interest.

In certain modes of processing irradiated fuel elements from nuclear reactors a residual solution is obtained after separating the plutonium, which solution except for the fission products contains practically all the uranium. From a chemical point of view the soultion is a highly diluted solution of fission products in a concentrated ($\approx$0.8 M) uranyl nitrate solution, which is, furthermore, relatively strongly ($\approx$2 M) acidic from nitric acid. It is desirable to separate the quantitatively small content of fission products responsible for practically all of the radioactivity from the solution, primarily in order to enable a concentration of the activity to a small volume, which to a great extent facilitates and lowers the cost for the continued storing thereof. Secondly, there is also aimed at a production in a pure form of fission products interesting from a technical and scientific point of view.

The total amount of fission products is in the order of 2 grams per liter, composed of a very great number of different nuclides. However, only a few of the nuclides essentially contribute to the activity, particularly after the solution having decayed for some period of time, so that all short-lived activities have decayed. In the long run only the most long-lived fission products, namely the $\beta$-$\gamma$-emitting $^{137}Cs$ and the merely $\beta$-emitting $^{90}Sr$, both having a half life of about 30 years, are of real importance for the activity of the solution. After five years already these elements are completely dominating; only a smaller part of the activity is then due to other nuclides, primarily the pairs $^{144}Ce$–$^{144}Pr$ and $^{106}Ru$–$^{106}Rh$, and $^{147}Pm$. However, at shorter decay times also isotopes of other elements considerably contribute to the activity, particularly the pairs $^{95}ZR$–$^{95}Nb$ and $^{140}Ba$–$^{140}La$, and furthermore $^{91}Y$ and $^{86}Rb$. The desired separation method should be able to separate ions of the types formed from these elements, and primarily the most important ones, $Cs^+$ and $Sr^{2+}$, from the great amount of uranyl salt (uranium being present in the form of the ion $UO_2^{2+}$).

A method of separation which, due to its simplicity in handling, is particularly suitable for active solutions is that of ion exchange. In view of the relatively high sensitivity to irradiation of the organic ion exchangers only inorganic ion exchangers should be taken into consideration for the highly active solutions involved here.

In view of the limited capacity of the ion exchanger, it is furthermore necessary to look for a method, in which the separation takes place by sorption of the small amounts of fission product ions on the ion exchanger, while the great amount uranyl ions remain in solution. However, it is difficult to realize this idea for the reason that with ion exchangers, organic as well as inorganic, the tendency to sorb $UO_2^{2+}$ is normally stronger than, or at least about as strong as that of $Cs^+$ or $Sr^{2+}$.

It has now been found that an ion exchanger of remarkable characteristics can be produced from zirconium phosphate. It has thus been found that in a acidic aqueous solution of mono-atomic metal ions, such as of alkali metals, alkaline earth metals and rare earths, particularly cesium and strontium, and multi-atomic ions containing metal, such as the uranyl ion and other actinoic ions of the same type, said ions can be separated by bringing the solution into contact with a solid phase, for instance grains, of zirconium phosphate having a mole ratio P:Zr of about 2, preferably within the range 1.8–2.1, particularly 1.9–2.0, and having a water content (removable by calcination) of 0.8–2, suitably 1–1.5 moles $H_2O$ per mole Zr. As a rule, optimum effect is obtained at about 1 mole $H_2O$ per mole Zr, and this optimum is so pronounced, that it is to be suspected that the effective substance is zirconium-monohydrophosphate i.e., the monohydrophosphate group is the functional group of the sorbant of the invention. At least with regard to strontium there is a certain effect also below this value. However, the degree of sorption is rather low but the selectivity seems to be good.

The zirconium phosphate should be present in microcrystalline form, for instance with an average crystallite size of the order of magnitude of 100 A., i.e. essentially within the range 10–1000 A., for instance 50–500 A.

Sorption experiments with positive ions, particularly with each of cesium, strontium and uranyl, have been carried out with zirconium phosphate sorbants of varying water contents obtained by successive dehydration of a preparation relatively rich in water. The experiments have shown, that at gradually progressing dehydration the sorption of $UO_2^{2+}$ soon becomes very slow whereas those of $Sr^{2+}$ and $Cs^+$ are influenced very little, even if the dehydration is advanced relatively far. Obviously, the interstices of the gel structure, within which the ions have to diffuse to reach the functional groups, are rather small for an ion as great as $UO_2^{2+}$, which has, moreover, a low order of symmetry, and since the interstices shrink as the dehydration proceeds, the diffusion will very soon become very much hampered. However, for a smaller ion having spherical symmetry, such as $Sr^{2+}$, the interstices are sufficient for a relatively unobstructed diffusion, even if most of the water is removed. Furthermore, it is to be assumed that when the dehydration has been carried on to a certain critical value, the interstices have shrunk to such a degree that the ions no longer can diffuse therein at all. Then a rather sudden and very large fall in the load of the gel at equilibrium will be found, inasmuch as the ions now are restricted to the few functional groups, which are particularly easily accessibly positioned on the outer parts of the gel crystallites. At further dehydration the functional monohydrophosphate groups will be destroyed. By dehydrating it to an adequate degree it should consequently be possible to obtain a gel, which still easily sorbs $Sr^{2+}$ and $Cs^+$, but practically completely excludes $UO_2^{2+}$.

It is not without importance, how the ion exchanger is produced. For some experiments, which have led to the present invention, the gels used have been produced in the following way: A 0.3 M solution of zirconyl nitrate in 1 M nitric acid is precipitated with 0.75 M phosphoric acid solution, until 3 moles phosphoric acid have been added per mole of zirconium. The formed gel is left in contact with its mother liquor, at frequent stirring, for 2 to 3 days. The phosphate content thereof, obtained by analyzing the content of phosphoric acid remaining in the mother liquor, then rises from about 1.9 to 2.0–2.1 moles of phosphate per mole of zirconium. The gel is centrifuged from the mother liquor and dried (under radiator, at 50–60° C.) until the loss of weight at calcination to about 1000° C. has decreased to between 50 and 60%. After this preliminary drying, facilitating further washing, the gel is then seemingly dry and can be crushed to a coarse powder, which is washed free from still adhering mother liquor with water. The washing is continued until the pH of the washwater at equilibrium has increased to about 3. In view of the fact that the gel is weakly hydrolyzed when treated with water, phosphoric acid then being released, a higher pH-value is not obtained. The washed gel is dried to a calcination loss of 50%, which is now equal to its water content, and the final ratio of phosphate/zirconium, P/Zr, is determined by direct analysis. Owing to the washing this ratio has again decreased; the values found lie between 1.89 and 1.98 for different preparations. For those two, the sorption characteristics of which are given below, the values lie between 1.95 and 1.98. X-ray diffraction measurements (powder photogram) have shown, that the gels obtained in this way are micro-crystalline, having an average crystallite size of about 100 A.

Further dehydration is carried out by drying the gel in an oven at different temperatures until equilibrium is obtained. At each temperature the remaining water content is determined by calcination of samples taken. The composition of the gel being then known the number of moles of water per mole of zirconium can be calculated. By simultaneous sorption experiments with the gels thus treated the selectivity between $Cs^+$, $Sr^{2+}$ and $UO_2^{2+}$ is then determined as a function of moles of water per mole of zirconium. The invention is not limited to this method of production, which of course can be modified by those skilled in the art.

As examples of the invention reference will now be made to some experiments that have been carried out.

In the sorption experiments, for each kind of ion a solution having an initial concentration of 1 mm. was shaken with the gel, the chosen ratio between the volume of solution and the amount of gel being 73.0 ml. per gram of gel, based on the gel less its water content. In this way the used amount of gel, in spite of varying water contents, will always contain the same number of phosphate groups, i.e. the same number of functional groups, as long as the dehydration has not begun to attack them. For the gels here used having P/Zr=1.95 and 1.98, respectively, the destruction of the functional groups starts at a water content of 0.975 and 0.99 moles $H_2O$/mole Zr. Changes of the sorption observed at higher water contents than these must be caused by something else than the disappearing of the functional groups.

The sorption effect is judged by measuring the distribution $f$, which is defined as the ratio between the concentration on the gel and the concentration in the solution after shaking. The distribution is obtained by directly analyzing the solution. Hereinbelow $f$ is given with the dimension $1/g$.

The selectivity between $UO_2^{2+}$ and $Cs^+$ at pH=1 has been investigated at different shaking times. It is found that cesium and uranyl are sorbed to essentially the same degree, viz., log $f=-0.6$ to $-0.4$, for water contents down to about 5 moles $H_2O$ per mole Zr. After a slight increase in the range of about 5.2 moles $H_2O$ per mole Zr the sorption of $Cs^+$ suddenly increases ever faster, passes a sharp maximum and then falls even faster down to 0. The very pronounced sorption peak has about the same height, log $f$ about 0.8, for both gels, while the position thereof varies somewhat. The maximum is for each of the samples at 1.1 and 1.5 moles $H_2O$/mole Zr for P/Zr=1.95 and 1.98, respectively.

In order that a suitably dehydrated gel shall maintain its high peak-sorption it is required, that it does not rapidly take up water from the solution and revert to a condition corresponding to a too high water content. It is noted, that the sorption also at the peak decreases only slowly with time, and when 2 moles $H_2O$/mole Zr has been reached, it decreases not at all.

At all water contents $UO_2^{2+}$ is sorbed slower than $Cs^2$. Nevertheless, the sorption occurs fairly rapidly at high water contents but decreases considerably with decreasing water contents. The sorption of $UO_2^{2+}$ does not show any peak at the initial stages of the breaking up of the structure. In striking contrast to what was observed to happen for $Cs^+$, the sorption of $UO_2^{2+}$ here instead begins to decrease strongly.

Thus, there is a relatively narrow range of water contents, where zirconium phosphate gels of the composition indicated herein above show a very high and selective sorption of $Cs^+$ relative to $UO_2^{2+}$, whereas the sorption of both types of ions is about the same at higher water contents.

The selectivity between $UO_2^{2+}$ and $Sr^{2+}$ has been investigated at pH=2, as the sorption of $Sr^{2+}$ is still very low at the previously used pH=1. For P/Zr=1.95 and after a short contact time, 4 hours, one finds a curve of similar type as for $Cs^+$, but the peak is here much smaller. At pH=2 $UO_2^{2+}$ is sorbed much stronger than is $Sr^{2+}$ on all gels with a high water content above that critical to the invention. However, if the water content decreases the sorption of $UO_2^{2+}$ decreases faster and faster, and it becomes lower than for $Sr^{2+}$ from about 2 moles $H_2O$/mole Zr. Thus, it is true also for $Sr^{2+}$ that at such a low water content it is sorbed considerably stronger by the gel than is $UO_2^{2+}$, in spite of the fact that normally the opposite is the case to a great extent.

A gel having the lower ratio P/Zr=1.22 has not at any water content the strong preference to $Cs^+$ over $UO_2^{2+}$, which is a characterizing feature of gels with P/Zr close to 2.

The following experiment shows the effect of a simultaneous presence of cesium and uranyl.

When shaking 147 mg. of zirconium phosphate gel having a ratio P/Zr of 1.95 and having 1.08 mole $H_2O$/mole Zr (corresponding to 137 mg. waterfree gel) with 10 ml. of a 1 mm. $Cs^+$-solution, which except for cesium nitrate contained only 100 mm. nitric acid (pH=1), $Cs^+$ was sorbed to 97.6%.

In an experiment which in all respect was completely identical to the previous one except for the fact that the solution also held 700 mm. uranyl nitrate, corresponding to 167 g. U/1, there was obtained almost as large a sorption of $Cs^+$, 96.5%. Even such a considerable uranyl concentration does thus not significantly influence the sorption of $Cs^+$ on a gel treated according to the invention.

The increase of $Cs^+$-sorption caused by the dehydration is of course important for the possibility of its separation from uranium. The fact that the increase is substantial is clear from the fact that a gel as above having P/Zr=1.95 and containing 8–10 moles $H_2O$/mole Zr sorbs only 77% at the conditions described above, whereas the gel dehydrated to 1.08 moles $H_2O$/mole Zr sorbs 97.6%. The amount of $Cs^+$ remaining in the solution is thus substantially different in the both cases.

Experiments carried out with zirconium phosphate preparations produced so as to be given an amorphous structure show that also such preparations show selective sorption, the maximum, however, having a different character. It is broader at least in some cases and starts already at 2–3 moles $H_2O$/mole Zr.

I claim:

1. A method of selectively separating ions of alkali metals from uranyl ions, $UO_2^{2+}$ by sorption from an acidic aqueous solution containing such ions, comprising contacting said solution with a sorbant consisting of solid particles of zirconium phosphate having a mole ratio P:Zr within the range 1.8–2.1, and having a water content, removable by calcination, of 0.8–2 moles $H_2O$ per mole Zr.

2. A method as claimed in claim 1, in which the ions selectively separated from said solution are $Cs^+$ ions.

3. A method as claimed in claim 1, in which the mole ratio P:Zr is within the range 1.9–2.0, and in which the water content removable by calcination is within the range 1.0–1.5 moles $H_2O$ per mole Zr.

4. A method as claimed in claim 1, in which said zirconium phosphate is microcrystalline, having a crystallite size substantially within the range of 50–500 A.

5. A method as claimed in claim 1 in which said water content has been obtained by dehydrating a zirconium phosphate richer in water.

6. A method as claimed in claim 1 for removing fission products of low concentration from an acidic concentrated uranyl nitrate solution, comprising contacting the solution with the sorbant defined in claim 1.

7. A method for removing fission products of low concentration from an aqueous acidic concentrated uranyl nitrate solution, comprising contacting said solution with solid particles of zirconium phosphate having a mole ratio P:Zr within the range 1.8–2.1 and having a water content, removable by calcination, of 0.8–2 moles $H_2O$ per mole Zr.

References Cited

UNITED STATES PATENTS

| | | | |
|---|---|---|---|
| 2,859,093 | 11/1958 | Russel et al. | 23—337 |
| 2,970,035 | 1/1961 | Stoughton | 23—337 |

OTHER REFERENCES

I Acta Chemica Scandinavica, vol. 18, 1964, pp. 1357–1367, Inorganic Ion Exchangers, II Sorption Rate and Dehydration Studies on Zirconium Phosphate and Tungstate Gels, S. Ahrland, J. Albertsson, L. Johansson, B. Nihlgard, L. Nilsson.

II Acta Chemica Scandinavica, vol. 18, 1964, pp. 1861–1878, Inorganic Ion Exchangers, III Equilibrium Studies on Zirconium Phosphate Gels, S. Ahrland, J. Albertsson.

Amphlett et al., Nuclear Science Abstracts, vol. 18, Abstract #13757 (1964).

Harkin et al., Nuclear Science Abstracts, vol. 18, Abstract #13758 (1964).

Healy et al., Nuclear Science Abstracts, Vol. 14, Abstract #248 (1960).

BENJAMIN R. PADGETT, Primary Examiner

M. J. McGREAL, Assistant Examiner

U.S. Cl. X.R.

23—25; 210—38